US009835814B2

(12) United States Patent
Ambroz et al.

(10) Patent No.: US 9,835,814 B2
(45) Date of Patent: Dec. 5, 2017

(54) FIBER TERMINATION POINT WITH OVERLENGTH STORAGE

(71) Applicants: ADC CZECH REPUBLIC, S.R.O., Brno (CZ); TE CONNECTIVITY SPAIN, S.A., Madrid (ES); TYCO ELECTRONICS RAYCHEM BVBA, Kessel-Lo (BE)

(72) Inventors: Jiri Ambroz, Brno (CZ); Juraj Marak, Calovec (SK); Ales Smisek, Policka (CZ); Jose-Luis Gonzalez Blazquez, Madrid (ES); Karel An Johan Jaksons, Kessel-Lo (BE)

(73) Assignees: ADC CZECH REPUBLIC S.R.O. (CZ); COMMSCOPE CONNECTIVITY SPAIN, S.L. (ES); COMMSCOPE CONNECTIVITY BELGIUM BVBA (BE)

( * ) Notice: Subject to any disclaimer, the term of this patent is extended or adjusted under 35 U.S.C. 154(b) by 0 days.

(21) Appl. No.: 15/033,656

(22) PCT Filed: Nov. 5, 2014

(86) PCT No.: PCT/EP2014/073793
§ 371 (c)(1),
(2) Date: May 2, 2016

(87) PCT Pub. No.: WO2015/067645
PCT Pub. Date: May 14, 2015

(65) Prior Publication Data
US 2016/0252695 A1    Sep. 1, 2016

Related U.S. Application Data

(60) Provisional application No. 61/900,720, filed on Nov. 6, 2013.

(51) Int. Cl.
G02B 6/00 (2006.01)
G02B 6/44 (2006.01)
G02B 6/38 (2006.01)

(52) U.S. Cl.
CPC ......... *G02B 6/4446* (2013.01); *G02B 6/3897* (2013.01); *G02B 6/4457* (2013.01); *G02B 6/4466* (2013.01)

(58) Field of Classification Search
CPC .. G02B 6/4446; G02B 6/3897; G02B 6/4457; G02B 6/4466
(Continued)

(56) References Cited

U.S. PATENT DOCUMENTS 5,668,911 A * 9/1997 Debortoli ............. G02B 6/4446
385/135
5,724,469 A * 3/1998 Orlando ............... G02B 6/4453
385/135
(Continued)

OTHER PUBLICATIONS

International Search Report and Written Opinion for International Application No. PCT/EP2014/073793 dated Jan. 26, 2015 (10 pages).

*Primary Examiner* — Thomas A Hollweg
*Assistant Examiner* — Guy Anderson
(74) *Attorney, Agent, or Firm* — Merchant & Gould P.C.

(57) ABSTRACT

A fiber termination point arrangement (100) including an enclosure (110) and a storage member (130). The enclosure (110) holds at least one optical adapter having an external port. The storage member (130) includes a rearwardly facing cable spool (135). The fiber termination point arrangement (100) mounts over a wall outlet so that the cable spool (135) is hidden from view. The fiber termination point arrangement (100) has a rear input port that enables a cable or fiber to enter the fiber termination point arrangement (100) from the rear (e.g., at the cable spool) without extending beyond (Continued)

the boundaries of the fiber termination point arrangement (100) when routed from the wall outlet.

12 Claims, 7 Drawing Sheets

(58) Field of Classification Search
USPC .......................................................... 385/135
See application file for complete search history.

(56) References Cited

U.S. PATENT DOCUMENTS

| | | | |
|---|---|---|---|
| 6,249,634 B1 * | 6/2001 | Tenney | G02B 6/4453 |
| | | | 385/134 |
| 6,315,598 B1 | 11/2001 | Elliot et al. | |
| 6,788,871 B2 | 9/2004 | Taylor | |
| 7,400,814 B1 | 7/2008 | Hendrickson et al. | |
| 7,409,138 B1 * | 8/2008 | Frazier | G02B 6/445 |
| | | | 385/135 |
| 7,522,806 B2 * | 4/2009 | Hendrickson | G02B 6/4441 |
| | | | 385/134 |
| 7,546,018 B2 | 6/2009 | Hendrickson et al. | |
| 7,715,679 B2 | 5/2010 | Kowalczyk et al. | |
| 7,748,660 B2 | 7/2010 | Hendrickson et al. | |
| 7,756,379 B2 | 7/2010 | Kowalczyk et al. | |
| 7,869,682 B2 | 1/2011 | Kowalczyk et al. | |
| 7,894,701 B2 | 2/2011 | Kowalczyk et al. | |
| 8,131,126 B2 | 3/2012 | Kowalczyk et al. | |
| 8,189,984 B2 | 5/2012 | Kowalczyk et al. | |
| 8,229,267 B2 | 7/2012 | Kowalczyk et al. | |
| 8,265,447 B2 | 9/2012 | Loeffelholz et al. | |
| 8,380,035 B2 | 2/2013 | Kowalczyk et al. | |
| 8,494,333 B2 | 7/2013 | Kowalczyk et al. | |
| 8,494,334 B2 | 7/2013 | Kowalczyk et al. | |
| 8,705,929 B2 | 4/2014 | Kowalczyk et al. | |
| 8,774,588 B2 | 7/2014 | Kowalczyk et al. | |
| RE45,153 E | 9/2014 | Hendrickson et al. | |
| 8,891,931 B2 | 11/2014 | Kowalczyk et al. | |
| 9,057,860 B2 | 6/2015 | Kowalczyk et al. | |
| 9,063,316 B2 | 6/2015 | Loeffelholz et al. | |
| 9,188,760 B2 | 11/2015 | Kowalczyk et al. | |
| 9,229,185 B2 | 1/2016 | Kowalczyk et al. | |
| 9,261,663 B2 | 2/2016 | Loeffelholz et al. | |
| 9,261,666 B2 | 2/2016 | Kowalczyk et al. | |
| 9,417,417 B2 | 8/2016 | Loeffelholz et al. | |
| 2008/0292261 A1 | 11/2008 | Kowalczyk et al. | |
| 2009/0294016 A1 | 12/2009 | Sayres et al. | |
| 2012/0051707 A1 * | 3/2012 | Barnes | G02B 6/3897 |
| | | | 385/135 |
| 2013/0287358 A1 | 10/2013 | Alston et al. | |
| 2014/0153890 A1 | 6/2014 | Sayres et al. | |
| 2014/0161411 A1 | 6/2014 | Slater et al. | |
| 2015/0153513 A1 | 6/2015 | Xiao et al. | |
| 2015/0286023 A1 | 10/2015 | Van Baelen et al. | |
| 2015/0309276 A1 | 10/2015 | Collart et al. | |
| 2016/0025946 A1 | 1/2016 | Kowalczyk et al. | |
| 2016/0077301 A1 | 3/2016 | Sayres et al. | |
| 2016/0147030 A1 | 5/2016 | Kowalczyk et al. | |
| 2016/0161693 A1 | 6/2016 | Loeffelholz et al. | |
| 2016/0187607 A1 | 6/2016 | Kowalczyk et al. | |
| 2016/0223771 A1 | 8/2016 | Kowalczyk et al. | |

* cited by examiner

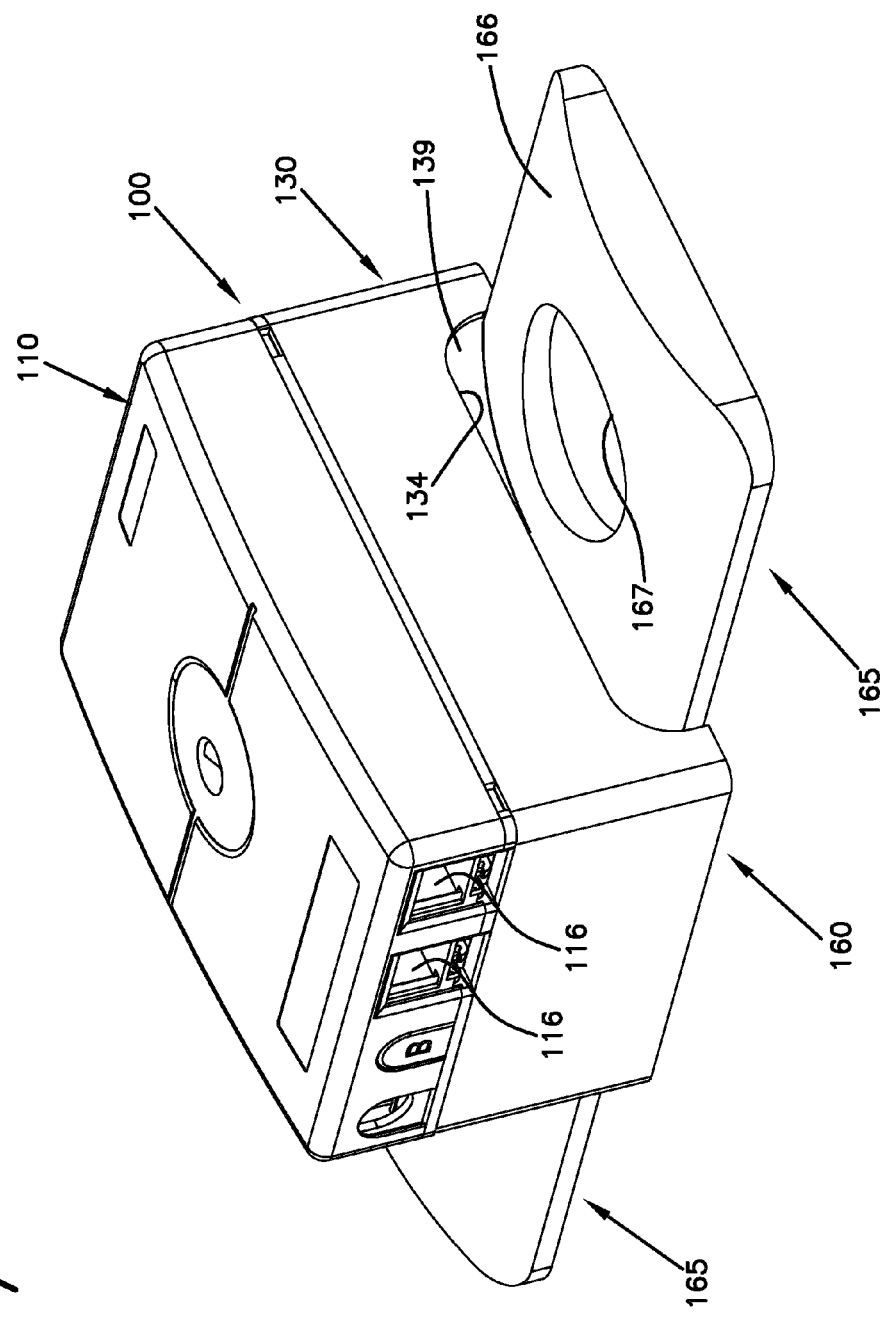

FIBER TERMINATION POINT WITH OVERLENGTH STORAGE

CROSS-REFERENCE TO RELATED APPLICATION(S)

This application is a National Stage of PCT/EP2014/073793, filed 5 Nov. 2014, which claims benefit of U.S. Patent Application Ser. No. 61/900,720 filed on Nov. 6, 2013, and which applications are incorporated herein by reference in their entireties. To the extent appropriate, a claim of priority is made to each of the above disclosed applications.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

SUMMARY

An aspect of the present disclosure relates to an example fiber termination point arrangement including an enclosure and a storage member. The enclosure defines a rear aperture and a peripheral aperture. The enclosure holds at least one optical adapter having an external port accessible through the peripheral aperture and an internal port accessible from within the enclosure. The storage member includes a surface through which an aperture is defined. The storage member is configured to couple to the rear of the enclosure so that the aperture aligns with the rear aperture of the enclosure. The storage member includes a cable spool extending rearwardly from the surface. The storage member is structured to fit over a wall outlet aperture.

In certain examples, the fiber termination point arrangement defines a rearward input port that enables an input fiber/cable to be routed directly from a wall opening at a wall outlet and into the fiber termination point arrangement without routing the fiber/cable beyond boundaries of the fiber termination point arrangement. Accordingly, a visible length of cable need not be routed along the wall.

In certain examples, the fiber termination point arrangement defines rear-facing cutout regions that are sized and shaped to accommodate adjacent wall outlet plates to facilitate mounting the fiber termination point arrangement at a group of wall outlets. In an example, sealing members are provided at the cutout regions to inhibit the intrusion of dirt or dust.

An aspect of the present disclosure relates to an example method of installing a fiber termination point arrangement at an electrical outlet location includes routing a connectorized end of an optical fiber from the electrical outlet location and into a fiber termination point arrangement through a rear of the fiber termination point arrangement; routing the connectorized end of the optical fiber through the fiber termination point arrangement to an internal port of the fiber termination point arrangement; plugging the connectorized end of the optical fiber into the internal port; winding overlength of the optical fiber around a rear spool of the fiber termination point arrangement; and mounting the fiber termination point arrangement with the wound cable overlength over the electrical outlet location.

In certain examples, the overlength storage of the fiber termination point arrangement allows for standard sized fibers/cables to be routed to the wall outlets. The fibers/cables are sized to enable routing of the fibers/cables from a signal source (e.g., an optical splitter) to the furthest wall outlet. For example, each of the fibers/cables routed through the walls to the wall outlets may be about thirty meters in length. Any overlength resulting from shorter routing paths to closer wall outlets can be stored at the fiber termination point arrangements.

In certain examples, the wall outlet is an electrical wall outlet. The optical fiber/fiber cable can be routed through the wall (e.g., through an existing wall duct) to the electrical wall outlet. The electrical contacts and outlet cover are removed from the electrical outlet. The fiber termination point arrangement is installed over the wall opening that previously served as an electrical wall outlet.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 7 is another perspective view of the fiber termination point arrangement of FIG. 1.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

In general, the disclosure relates to a fiber termination point arrangement configured to store cable overlength at a wall outlet. A connectorized fiber cable is routed through a wall (e.g., through a wall duct) to an outlet location. A connectorized end of the fiber cable is routed into the fiber termination point arrangement and plugged into an internal port of an optical adapter (e.g., an SC adapter, an LC adapter, an MPO adapter, an LX.5 adapter, etc.). Overlength of the connectorized fiber cable is wound around a spool defined by the fiber termination point arrangement. No portion of the cable extends beyond of the fiber termination point arrangement in view of a user.

In certain examples, the fiber termination point arrangement defines rear cutouts sized and shaped to fit over adjacent outlet covers when the fiber termination point arrangement is mounted at a wall outlet. In certain examples, sealing members can be disposed at the cutouts.

In some examples, a fiber termination point arrangement can be installed at an electrical outlet location. Installing the fiber termination point arrangement includes routing a connectorized end of an optical fiber from the electrical outlet location and into a fiber termination point arrangement. The connectorized end of the optical fiber is plugged into an internal port of an optical adapter disposed in the fiber termination point arrangement. Overlength of the optical fiber is stored at a rear spool of the fiber termination point arrangement. The fiber termination point arrangement with the stored cable overlength is mounted over the electrical outlet location. The fiber termination point arrangement accommodates any adjacent outlet covers.

In certain examples, an electrical outlet cover is removed from the electrical outlet location to expose a wall opening and the fiber termination point arrangement is mounted over the exposed wall opening. In certain implementations, the fiber termination point arrangement seals to electrical covers at one or more adjacent electrical outlets.

Figure 1:
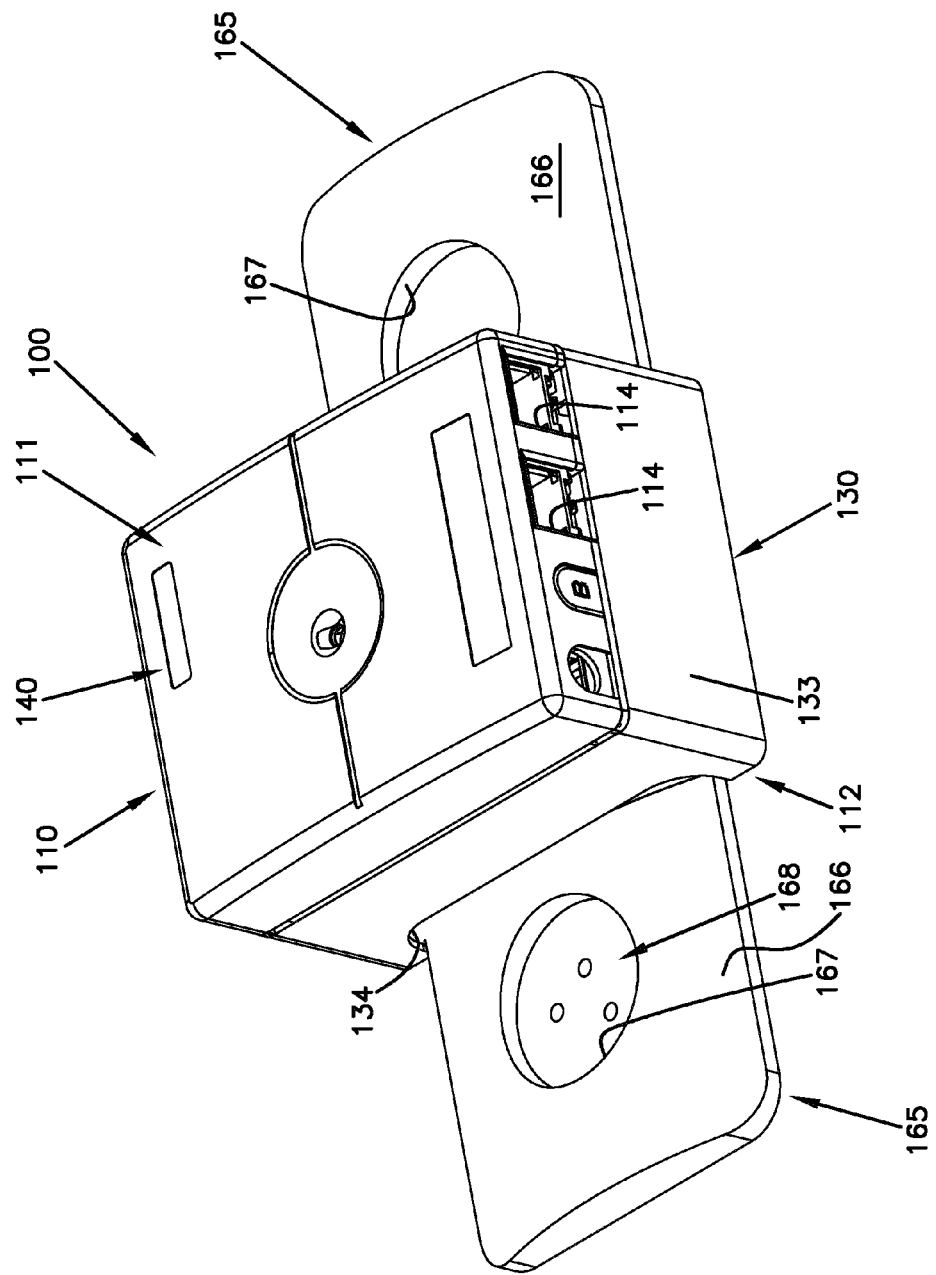
FIG. 1 is a front perspective view of an example fiber termination point arrangement configured in accordance with the principles of the present disclosure.

FIG. 1 illustrates an example fiber termination point arrangement 100 configured to be mounted to a wall at a subscriber location to provide access to an optical fiber network. In certain implementations, the fiber termination point arrangement 100 is configured to be mounted at a wall outlet location 160 at the subscriber location. In an example, the fiber termination point arrangement 100 is configured to be mounted at an electrical wall outlet location 160.

In certain implementations, the fiber termination point arrangement 100 is configured to inhibit visibility of optical fiber routed to an internal port of the fiber termination point arrangement 100. In an example, the fiber termination point arrangement 100 does not include a visible fiber input port 113. In an example, an input port (e.g., an aperture, a gland, a slot or passage through a gasket, etc.) of the fiber termination point arrangement 100 is hidden from view when the fiber termination point arrangement 100 is mounted to a wall or other surface.

The fiber termination point arrangement 100 includes an enclosure 110 and a storage member 130. The enclosure 110 has a front 111 and a rear 112. The rear 112 of the enclosure 110 is coupled to a front of a storage member 130, which is configured to mount over the wall outlet 160. The rear 112 of the enclosure 110 defines a rear aperture 125 providing access to an interior of the enclosure 110 through the rear 112 of the enclosure 110.

The enclosure 110 defines at least one peripheral aperture 114 through which an optical fiber port is accessible. For example, an optical adapter 115 can be disposed in the enclosure 110 and an external port 116 of the optical adapter 115 can be accessible through the peripheral aperture 114 (see FIG. 3). In the example shown, the enclosure 110 defines two peripheral apertures 114 providing access to optical fiber ports. In other implementations, the enclosure 110 can define any desired number of apertures 114.

In various implementations, the enclosure 110 can hold various optical components (e.g., a splice tray, an optical power splitter, a fanout arrangement, a wave division multiplexer, etc.). In the example shown, the enclosure 110 is configured to hold optical adapters 115 without any other signal coupling.

Figure 2:
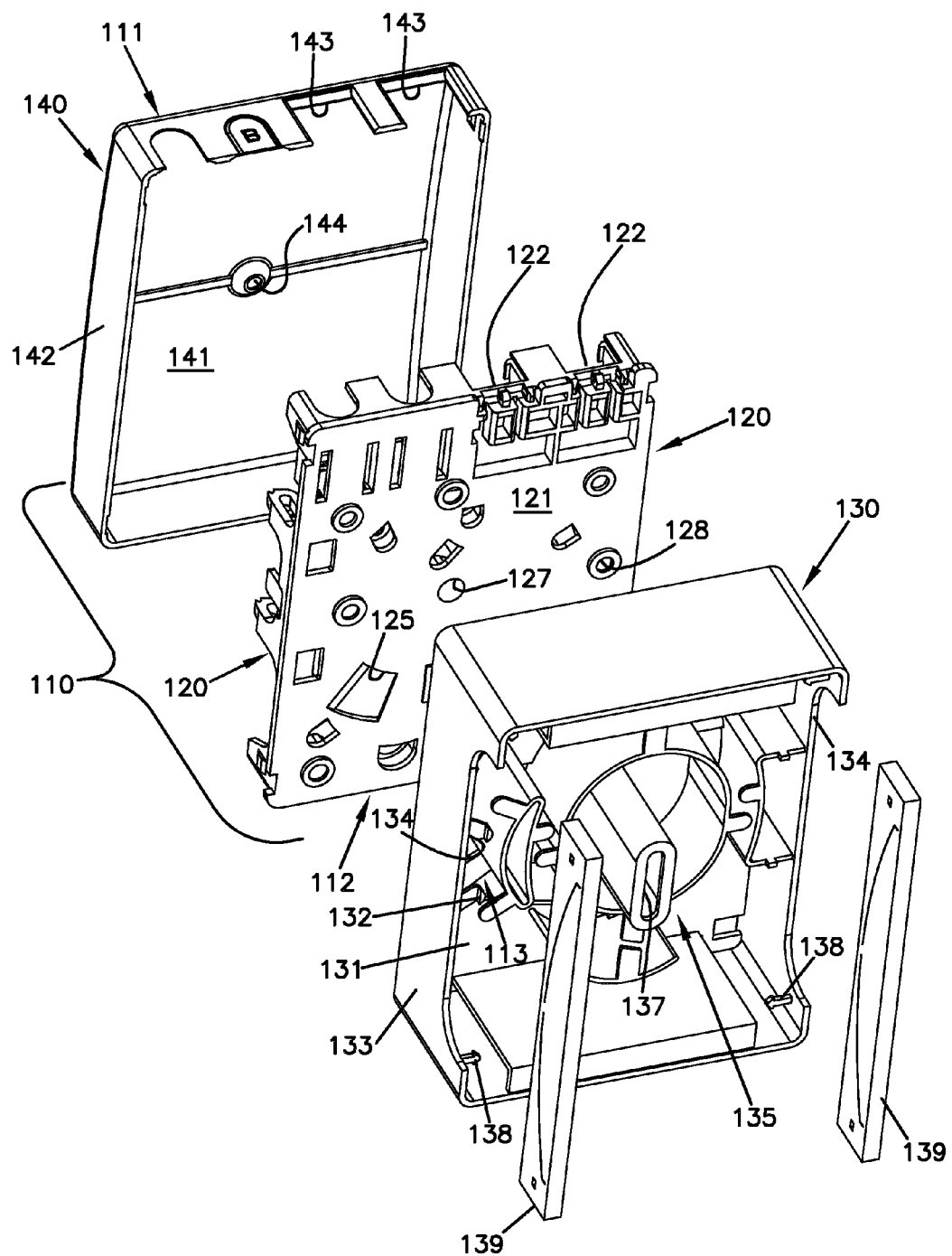
FIG. 2 is a rear exploded view of the fiber termination point arrangement of FIG. 1.
Figure 3:
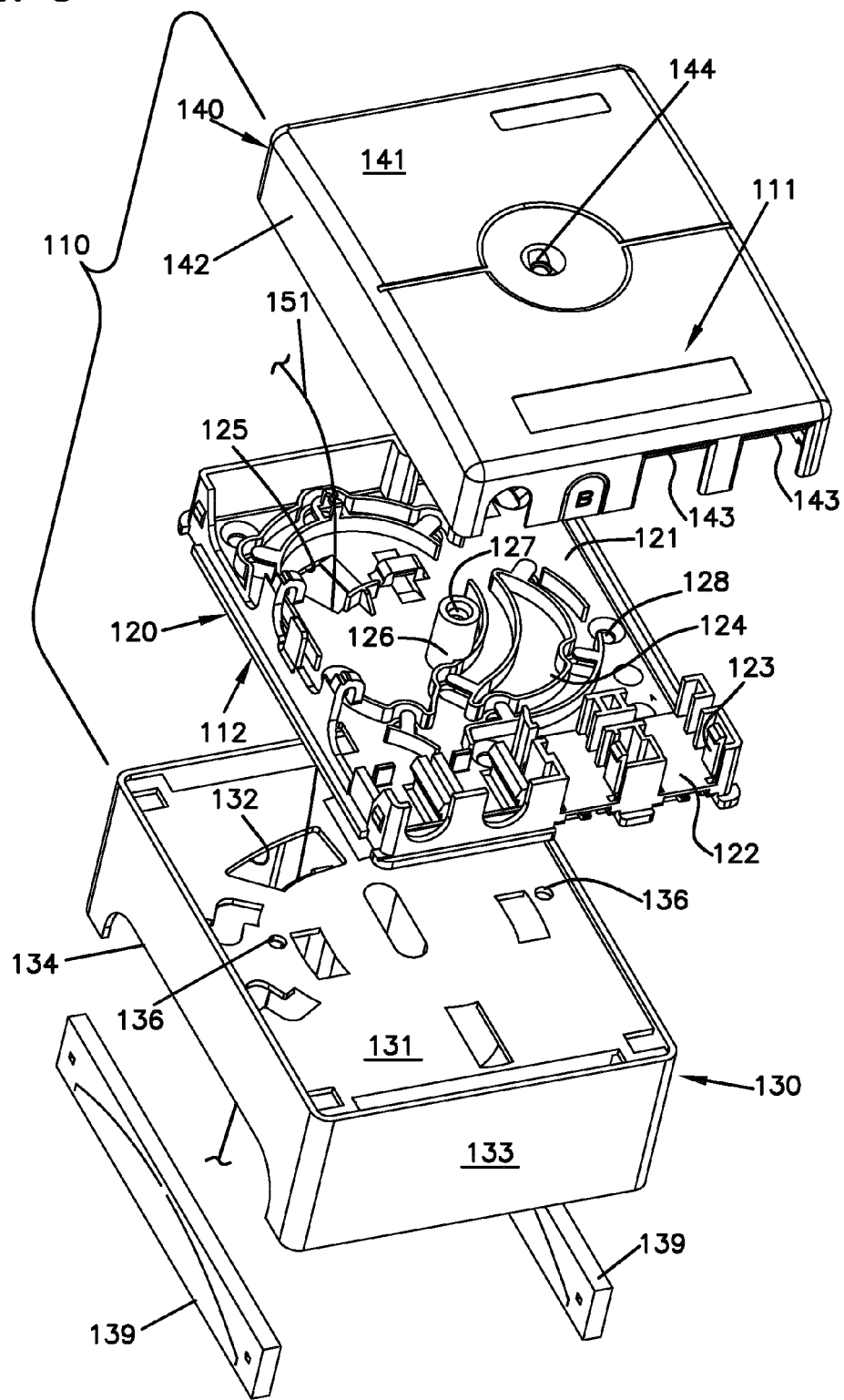
FIG. 3 is a front exploded view of the fiber termination point arrangement of FIG. 1.
Figure 4:
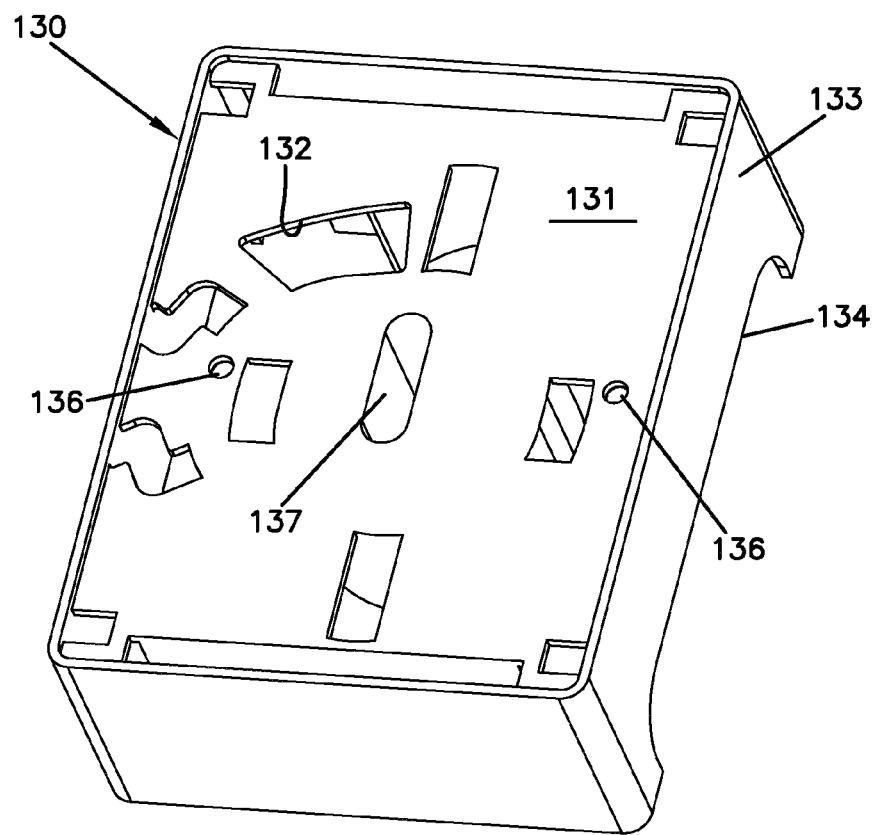
FIG. 4 is a front perspective view of an example storage member suitable for use with the fiber termination point arrangement of FIG. 1.
Figure 5:
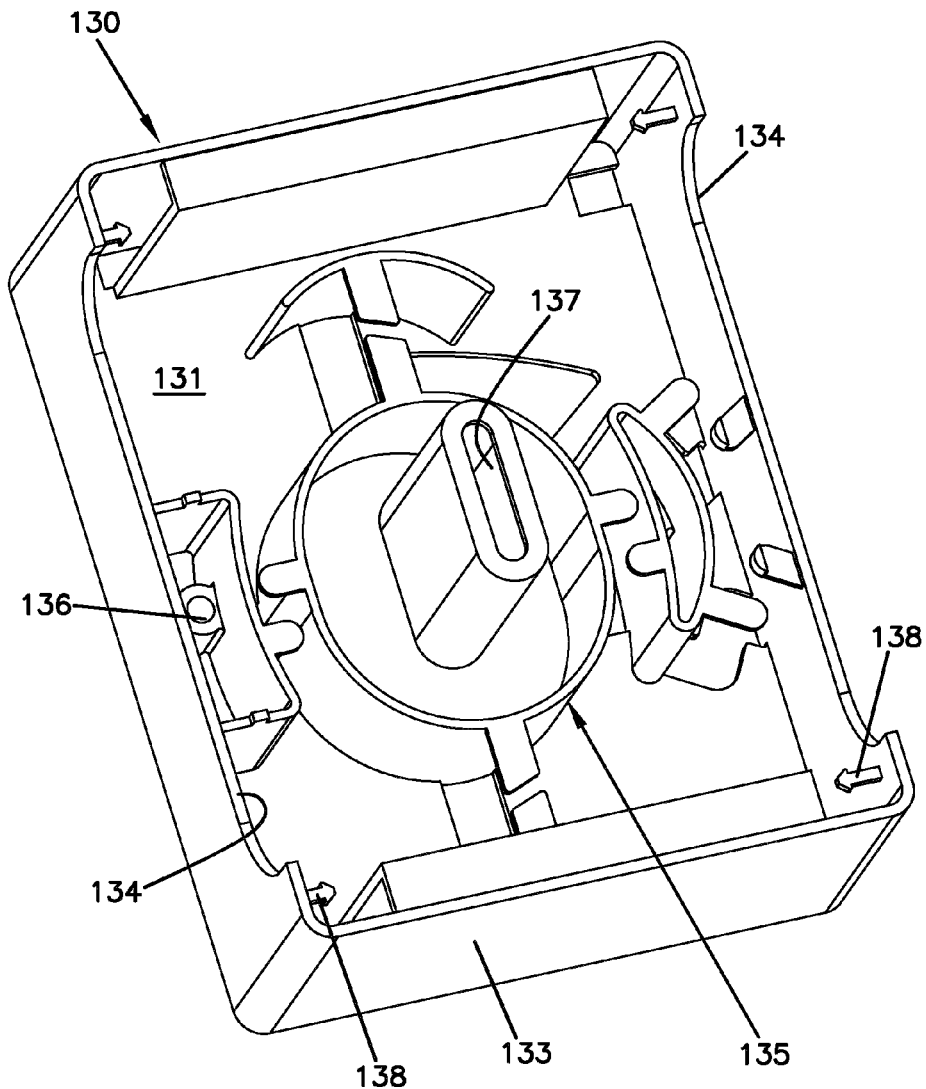
FIG. 5 is a rear perspective view of an example storage member suitable for use with the fiber termination point arrangement of FIG. 1.

FIGS. 2 and 3 are exploded views of the fiber termination point arrangement 100. As shown, the storage member 130 includes a cable spool 135 extending rearwardly from a surface 131. In the example shown, the cable spool 135 includes a drum fixed to the surface 131 and retention fingers extending outwardly from a distal end of the drum. In certain examples, one or more bend radius limiters are disposed around the drum. In certain implementations, a peripheral wall 133 extends rearwardly from a periphery of the surface 131 around the cable spool 135.

In some examples, the cable spool 135 is sized and configured to hold up to about one hundred meters of optical fiber 151. In certain examples, the cable spool 135 is sized and configured to hold up to about fifty meters of optical fiber 151. In certain examples, the cable spool 135 is sized and configured to hold up to about forty meters of optical fiber 151. In certain examples, the cable spool 135 is sized and configured to hold up to about thirty meters of optical fiber 151. In some implementations, the cable spool 135 is configured to hold buffered or upjacketed optical fiber 151. In other implementations, the cable spool 135 is configured to hold a fiber cable 150 that includes one or more optical fibers 151.

The surface 131 of the storage member 130 defines a routing aperture 132 (FIG. 3). The storage member 130 is configured to couple to the rear 112 of the enclosure 110 so that the routing aperture 132 aligns with the rear aperture 125 of the enclosure 110. One or more optical fibers can be routed into the enclosure via the routing aperture 132 and the rear aperture 125. Accordingly, the routing aperture 132 and the rear aperture 125 cooperate to define the input port of the fiber termination point arrangement 100.

In some implementations, the peripheral wall 133 of the storage member 130 defines one or more cutout regions 134 sized and configured to accommodate a non-flat structure at the mounting location. For example, the cutout regions 134 can be sized and shaped to accommodate cover plates 166 of adjacent wall outlets 165. In certain implementations, sealing members 139 are configured to mount to the storage member 130 at the cutout regions 134. For example, the storage member 130 can include retention structures 138 that hold the sealing members 139 at the cutout regions 134.

In some implementations, the enclosure 110 includes a tray 120 and a cover 140 that cooperate to define the peripheral apertures 114. In certain implementations, the cover 140 is removably coupled to the tray 120. In the example shown, the tray 120 includes a fastener support 126 that defines a central opening 127, and the cover 140 defines a central opening 144 that aligns with the central opening 127 when the cover 140 is coupled to the tray 120. In such examples, a fastener (e.g., a screw) can be inserted through the central openings 144, 127 from the front 111 of the enclosure 110 to secure the cover 110 to the tray 120.

The tray 120 includes a tray body 121 defining one or more adapter mounting locations 122 at which one or more optical adapters 115 are mounted. The adapter mounting locations 122 align with the enclosure peripheral apertures 114. In an example, the tray 120 defines a single adapter mounting location 122. In another example, the tray 120 defines multiple adapter mounting locations 122. In the example shown, the tray 120 defines two adapter mounting locations 122. Adapter retention structures 123 (e.g., latching hooks, etc.) are disposed at the adapter mounting locations 122 to retain the optical adapters 115 at the adapter mounting locations 122.

The tray 120 also defines the rear aperture 125 of the enclosure 110 extending through the tray body 121. The tray 120 is configured to couple to the storage member 130 so that the rear aperture 125 aligns with the routing aperture 132. The tray body 121 also includes routing structures 124 configured to route at least one optical fiber from the rear aperture 125 to an adapter mounting location 122. In certain implementations, the routing structures 124 are configured to route each of multiple optical fibers from the rear aperture 125 to an adapter mounting location 122.

In some implementations, the cover 140 is configured to mount to the tray 120 at a first fastening location and the tray 120 is configured to mount to the storage member 130 at a second fastening location that is spaced from the first fastening location. In the example shown, the first fastening location is centrally located relative to the enclosure 110 and the second fastening location is located closer to a periphery of the enclosure 110. For example, the tray 120 can define one or more fastener apertures 128 that extend through the tray body 121 and align with one or more fastener apertures 136 defined in the storage member 130. One or more fasteners (e.g., screws) can be inserted through the fastener apertures 128, 136 to secure the tray 120 to the storage member 130.

Figure 6:
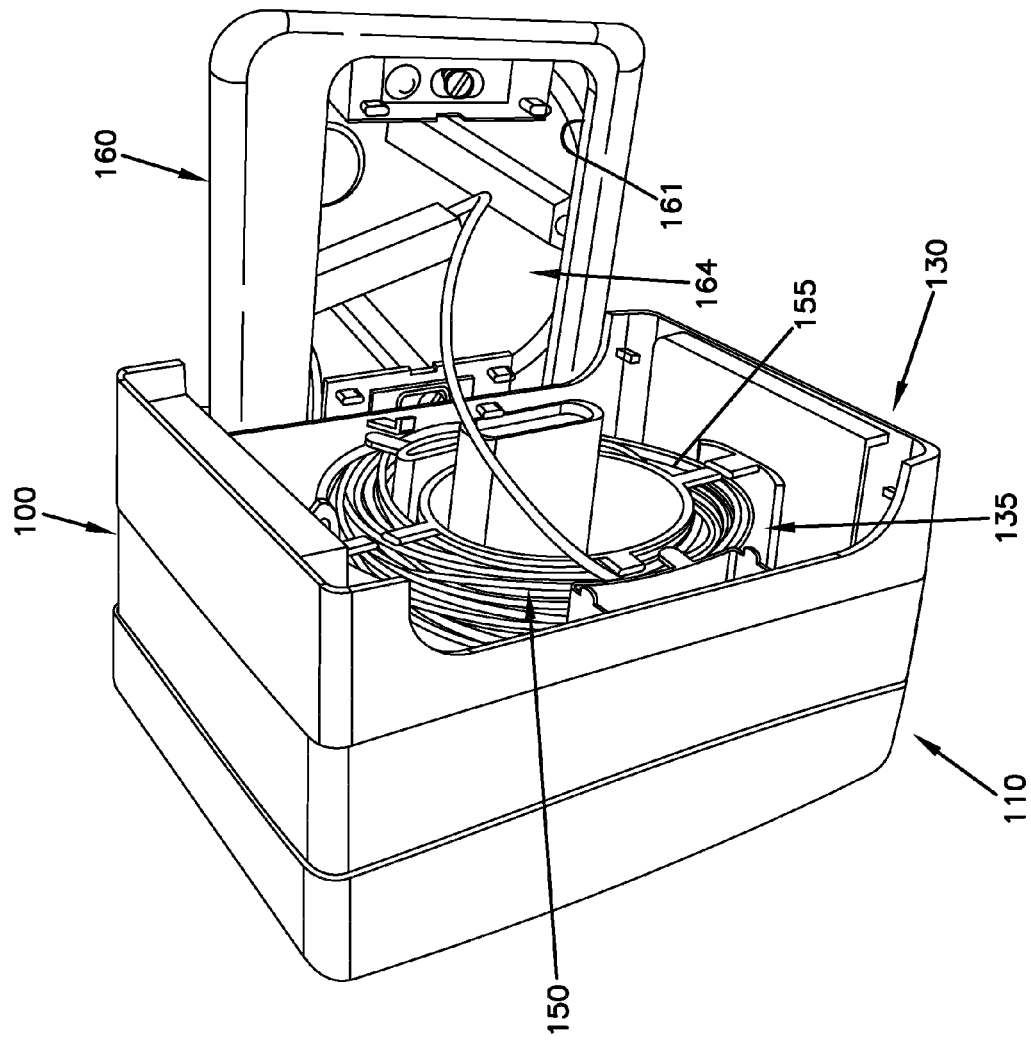
FIG. 6 is a perspective view of the fiber termination point arrangement of FIG. 1 showing fiber cable routed outwardly from a wall outlet and wound around a rearward-facing cable spool of the fiber termination point arrangement.

As shown in FIG. 6, a fiber termination point arrangement 100 can be installed at a wall outlet location 160 by routing a connectorized end 152 of an optical fiber 151 from the wall outlet location 160 and into a fiber termination point arrangement 100 through a rear of the fiber termination point arrangement 100; storing overlength of the optical fiber 151 at the cable spool 135; and mounting the fiber termination point arrangement 100 over the wall outlet location 160. For example, the overlength can be wound around the cable spool 135 after the connectorized end 152 of the optical fiber 151 is routed to the optical adapter 115 within the enclosure 110.

In some implementations, the fiber termination point arrangement 100 is removably mounted at the wall outlet. In certain examples, one or more fasteners can be inserted through the fiber termination point arrangement 100 and into fastener receiving structures disposed within a wall opening 161 at the wall outlet location 160. In an example, the fastener extending through the central openings 144, 127 of the enclosure 110 also extends through a central aperture 137 defined in the storage member 130 to the fastener receiving structure in the wall opening. In other implementations, the fiber termination point arrangement 100 may be otherwise secured to the wall around the wall outlet location 160.

In certain implementations, the connectorized ends 152 of multiple optical fibers 151 are routed from the wall outlet location 160 and into the fiber termination point arrangement 100. The connectorized end 152 of each optical fiber 151 is routed to the internal port of a different optical adapter 115. The external ports 116 of the optical adapters 115 are accessible through the peripheral apertures 114 of the enclosure 110. In some implementations, the multiple optical fibers 151 can extend through a common fiber cable 150. In other implementations, the multiple optical fibers 151 can be included in different fiber cables 150.

As shown in FIG. 7, the wall outlet location 160 can be disposed adjacent to another wall outlet location 165. In the example shown, the wall outlet location 160 can be disposed between two adjacent wall outlet locations 165. Each adjacent wall outlet location 165 can include a wall outlet cover 166 defining an aperture 167 through which electrical contacts 168 (see FIG. 1) are accessible (e.g., to an electrical plug).

In some implementations, the storage member 130 is configured to fit over the outlet covers 166 of adjacent wall outlets 165. For example, in certain implementations, the storage member 130 defines cutout regions 134 that fit over the outlet covers 166. In certain implementations, sealing members 139 are disposed at the cutout regions 134. The sealing members 139 seal to the adjacent outlet covers 166 to inhibit dirt or dust intrusion.

In certain implementations, the wall outlet location 160 can include an electrical wall outlet (e.g., for a telephone jack, for a power outlet, etc.). In some such implementations, the fiber cable(s) 150 including the optical fiber(s) 151 can be routed through an existing duct for an electrical cable (e.g., a telephone cable). In certain examples, the fiber termination point arrangement 100 can be mounted at one electrical wall outlet of a group of adjacent electrical wall outlets while the other electrical wall outlets continue to provide electrical connection services.

To install the fiber termination point arrangement 100 at the electrical wall outlet location 160, an electrical outlet cover is removed from the electrical outlet location 160 to expose a wall opening 161. The fiber cable 150 is routed through the wall to wall opening 161 at the electrical outlet location 160. For example, the fiber cable 150 can be fed through an existing duct in the wall (e.g., a phone cable duct).

A connectorized end 152 of the optical fiber 151/fiber cable 150 is inserted through the input port of the fiber termination point arrangement 100. For example, the connectorized end 152 can be fed through the routing aperture 132 in the storage member 130 and into the enclosure 110 through the rear aperture 125 in the tray 120. From the rear aperture 125, the connectorized end 152 of the fiber 151/cable 150 is routed along the tray body 121 to an optical adapter 115 disposed at an adapter mounting location 122. In an example, the fiber 151/cable 150 extends through the routing structures 124 disposed on the tray body 121. The connectorized end 152 is plugged into an internal port (i.e., inwardly-facing port) 117 of the optical adapter 115.

Any overlength 155 of the fiber 151/cable 150 is stored at the cable spool 135 at the rear of the storage member 130. For example, the overlength 155 can be manually wound around a stationary cable spool 135. In some implementations, all installed fibers 151/cables 150 have a standardized length (or one of multiple standardized lengths). In certain implementations, the installed fibers 151/cables 150 have a length of about fifty meters. In certain implementations, the installed fibers 151/cables 150 have a length of about forty meters. In certain implementations, the installed fibers 151/cables 150 have a length of about thirty meters.

The fiber termination point arrangement 100 is mounted over the wall opening 161 at the electrical wall outlet location 160 with the cable overlength 155 stored on the cable spool 135. In some implementations, the fiber termination point arrangement 100 is configured to accommodate adjacent outlet covers 166. For example, the fiber termination point arrangement 100 can be mounted so that the adjacent outlet covers 166 align with cutout regions 134 defined in the fiber termination point arrangement 100. In certain examples, sealing members 139 of the fiber termination point arrangement 100 engage and seal against the adjacent outlet covers 166.

The above specification, examples and data provide a complete sealing and retention arrangement description of the manufacture and use of the composition of the invention. Since many embodiments of the invention can be made without departing from the spirit and scope of the invention, the invention resides in the claims hereinafter appended.

LIST OF REFERENCE NUMERALS AND CORRESPONDING FEATURES

100 fiber termination point arrangement
110 enclosure
111 front
112 rear
113 input port
114 peripheral aperture(s)
115 adapter
116 external port
117 internal port
120 tray
121 tray body
122 adapter mounting location
123 retention arrangements
124 routing structures
125 rear aperture
126 fastener support
127 central aperture
128 fastener aperture
130 storage member
131 surface
132 routing aperture
133 peripheral wall
134 cutouts
135 cable spool
136 fastener aperture
137 central aperture
138 seal retention structure
139 sealing members
140 cover
141 front panel
142 peripheral wall
143 cutouts
144 central aperture
150 fiber cable
151 optical fiber
152 connectorized end
155 cable overlength
160 outlet location
161 wall opening
164 wall duct
165 adjacent wall outlet
166 outlet cover
167 outlet cover aperture
168 outlet contacts

What is claimed is:

1. A fiber termination point arrangement comprising:
an enclosure having a front and a rear, the enclosure defining a rear input port and a peripheral aperture through which a fiber connection can be made; and
a storage member including a surface through which an aperture is defined, the storage member being configured to couple to the rear of the enclosure so that the aperture aligns with the rear input port of the enclosure, the storage member including a cable spool extending rearwardly from the surface, the storage member being structured to fit over a wall outlet aperture wherein the storage member includes a peripheral wall extending around the cable spool, the peripheral wall defining cutouts at which sealing members can be mounted.

2. The fiber termination point arrangement as claimed in claim 1, further comprising an optical adapter disposed within the enclosure, the optical adapter having an internal port accessible from within the enclosure and an external port accessible through the peripheral aperture.

3. The fiber termination point arrangement as claimed in claim 1, wherein the enclosure includes a tray and a cover that cooperate to define the peripheral aperture, the cover being removably coupled to the tray.

4. The fiber termination point arrangement as claimed in claim 3, wherein the tray defines an adapter mounting location at which the optical adapter is held.

5. The fiber termination point arrangement as claimed in claim 4, wherein the tray defines routing structures shaped to route an optical fiber to the adapter mounting location.

6. The fiber termination point arrangement as claimed in claim 3, wherein the storage member couples to the tray of the enclosure, wherein the rear input port of the enclosure is defined by the tray.

7. The fiber termination point arrangement as claimed in claim 6, wherein the cover is fastened to the tray at a first fastening location, and wherein the tray couples to the storage member at a second fastening location that is spaced from the first fastening location.

8. The fiber termination point arrangement as claimed in claim 7, wherein the cover defines a central aperture that aligns with a central aperture of the tray to define the first fastening location; and wherein the tray defines a fastening aperture that aligns with a fastening aperture defined in the storage member to define the second fastening location.

9. The fiber termination point arrangement as claimed in claim 3, wherein the cover attaches to the tray at a first fastening location.

10. The fiber termination point arrangement as claimed in claim 1, wherein two cutouts are aligned at opposite sides of the peripheral wall.

11. The fiber termination point arrangement as claimed in claim 1, wherein the enclosure defines a second peripheral aperture at which a second optical adapter is disposed within the enclosure.

12. The fiber termination point arrangement as claimed in claim 1, wherein the cutouts are rear-facing.

* * * * *